United States Patent [19]

Tsutsumi

[11] Patent Number: 4,959,742
[45] Date of Patent: Sep. 25, 1990

[54] ROTARY HEAD MOUNTING DEVICE

[75] Inventor: Kazumasu Tsutsumi, Hamamatsu, Japan

[73] Assignee: Yamaha Corporation, Hamamatsu, Japan

[21] Appl. No.: 242,142

[22] Filed: Sep. 8, 1988

[30] Foreign Application Priority Data

Sep. 11, 1987 [JP] Japan .......................... 62-139059[U]

[51] Int. Cl.$^5$ .............................................. G11B 15/60
[52] U.S. Cl. .................................. 360/130.23; 360/84
[58] Field of Search ............... 360/107, 130.24, 84–85, 360/130.22, 130.23, 109

[56] References Cited

U.S. PATENT DOCUMENTS 3,636,275  1/1972  Sato ................................. 360/130.24
4,761,696  8/1988  Muller .................................... 360/84

Primary Examiner—A. J. Heinz
Attorney, Agent, or Firm—Spensley, Horn, Jubas & Lubitz

[57] ABSTRACT

A rotary head mounting device for mounting a rotary head obliquely on a chassis includes one or more oblique bases formed by outsert forming on the chassis. Each of the oblique bases has a mounting surface which is oblique to the chassis for mounting a rotary head thereon and a mounting hole for receiving a screw for fixing the rotary head which mounting hole is formed from the mounting surface into the oblique base vertically with respect to the mounting surface. The rotary head is fixed in its mounting portion to the mounting surface of the oblique bases by screwing the screw into each mounting hole through the mounting portion. The rotary head can be directly mounted on the oblique bases on the chassis without using a separate adaptor so that mounting of the rotary head on the chassis is facilitated. Besides, the mounting device can be made very simply and cheaply by outsert forming the mounting device simultaneously with outsert forming other parts on the chassis. In one aspect of the invention, positioning projections are provided on the oblique surfaces so that the rotary head can be mounted on the oblique bases with high accuracy without being affected by the accuracy of positions of the mounting holes.

7 Claims, 3 Drawing Sheets

ROTARY HEAD MOUNTING DEVICE

BACKGROUND OF THE INVENTION

This invention relates to a device for mounting a rotary head obliquely on a chassis suitable for use in a digital audio tape recorder or the like device.

As a scanning system in rotary head type tape recorders such as a video tape recorder (VTR) and a digital audio tape recorder (R-DAT), a helical scanning system is generally employed. According to the helical scanning system, the drum of the rotary head is rotated obliquely with respect to the running direction of the tape and the tape is scanned while it is wound about the drum with a result that an oblique track is formed on the tape of a limited width so that maximum possible signals may be recorded on unit track length.

In the helical scanning system, it is necessary, as shown in FIG. 3 for example, to mount a rotary head 1 on a chassis (not shown) in such a manner that a rotation shaft 2 of the rotary head 1 assumes an oblique relationship with respect to the horizontal chassis.

For realizing this oblique mounting of the rotary head 1, there are used, for example, mounting adaptors 3 as shown in FIGS. 4a and 4b. These mounting adaptors 3 are so formed that an upper surface 6 thereof on which the rotary head 1 is mounted is oblique with respect to a lower surface 5 thereof which comes in engagement with a chassis 4 and screw holes 7 are formed in the upper portions of the adaptors 3 to fix the rotary head 1 with screws 8.

In such mounting adaptors 3, the screw holes 7 must be formed vertically with respect to the oblique upper surface 6 and the forming of such screw holes 7 involves difficulty. One way for achieving this is to form screw holes 7 vertically with respect to the lower surface 5 in a state before the upper surface 6 is obliquely shaped in which the upper surface is parallel to the lower surface 5 and then cut off the upper portion of the adaptor 3 obliquely to define the oblique upper surface 6 or form screw holes 7 vertically with respect to the lower surface 5 in an upper portion of the mounting adaptor 3 which is preformed with an oblique upper surface 6 and then fix the rotary head 1 by inserting tapered washers 9 between the rotary head 1 and the screws 8 as shown in FIG. 4a. Another way for forming the screw holes 7 is to form screw holes 7 in an upper portion of the mounting adaptor 3 vertically with respect to the upper surface 6 and then cut off a lower portion of the mounting adaptor 3 obliquely to define a lower surface 5 as shown in FIG. 4b.

For cutting off an upper or lower portion of the mounting adaptor obliquely, it is necessary to form such mounting adaptor by zinc or aluminum die casting or resin forming and then subject the formed product to the secondary processing. If screw holes 7 vertical to the oblique upper surface 6 cannot be formed, the tapered washers 9 are required.

The mounting adaptor 3 using the tapered washer 9 is relatively easy to make but accuracy of mounting position of the rotary head 1 is not sufficiently high.

It is, therefore, an object of the invention to provide a device which is capable of accurately mounting a rotary head obliquely to a chassis and besides is easy to manufacture.

SUMMARY OF THE INVENTION

For achieving the above object, the rotary head mounting device for mounting a rotary head obliquely on a chassis according to the invention is characterized in that it comprises one or more oblique bases formed by outsert forming on the chassis, each of the oblique bases having a mounting surface which is oblique to the chassis for fixing a rotary head thereon and a mounting hole for receiving a screw for mounting the rotary head which mounting hole is formed from the mounting surface into the oblique base vertically with respect to the mounting surface, and the rotary head being fixed in its mounting portion to the mounting surface of the oblique base or bases by screwing the screws into the mounting holes through the mounting portion.

According to the invention, oblique bases having oblique mounting surfaces are formed on the chassis directly by outsert forming using upper and lower molds. Mounting holes are formed in the oblique bases by using draw pins separately from the upper and lower molds so that the upper and lower molds can be released smoothly. The rotary head can be directly mounted on the oblique bases on the chassis without using a separate adaptor so that mounting of the rotary head on the chassis is facilitated. Besides, the mounting device can be made very simply and cheaply by outsert forming the mounting device simultaneously with outsert forming other parts on the chassis. In one aspect of the invention, positioning projections are provided on the oblique surfaces so that the rotary head can be mounted on the oblique bases with high accuracy without being affected by the accuracy of positions of the mounting holes.

An embodiment of the invention will now be described with reference to the accompanying drawings.

BRIEF DESCRIPTION OF THE DRAWINGS

In the accompanying drawings.

DESCRIPTION OF A PREFERRED EMBODIMENT

Figure 1:
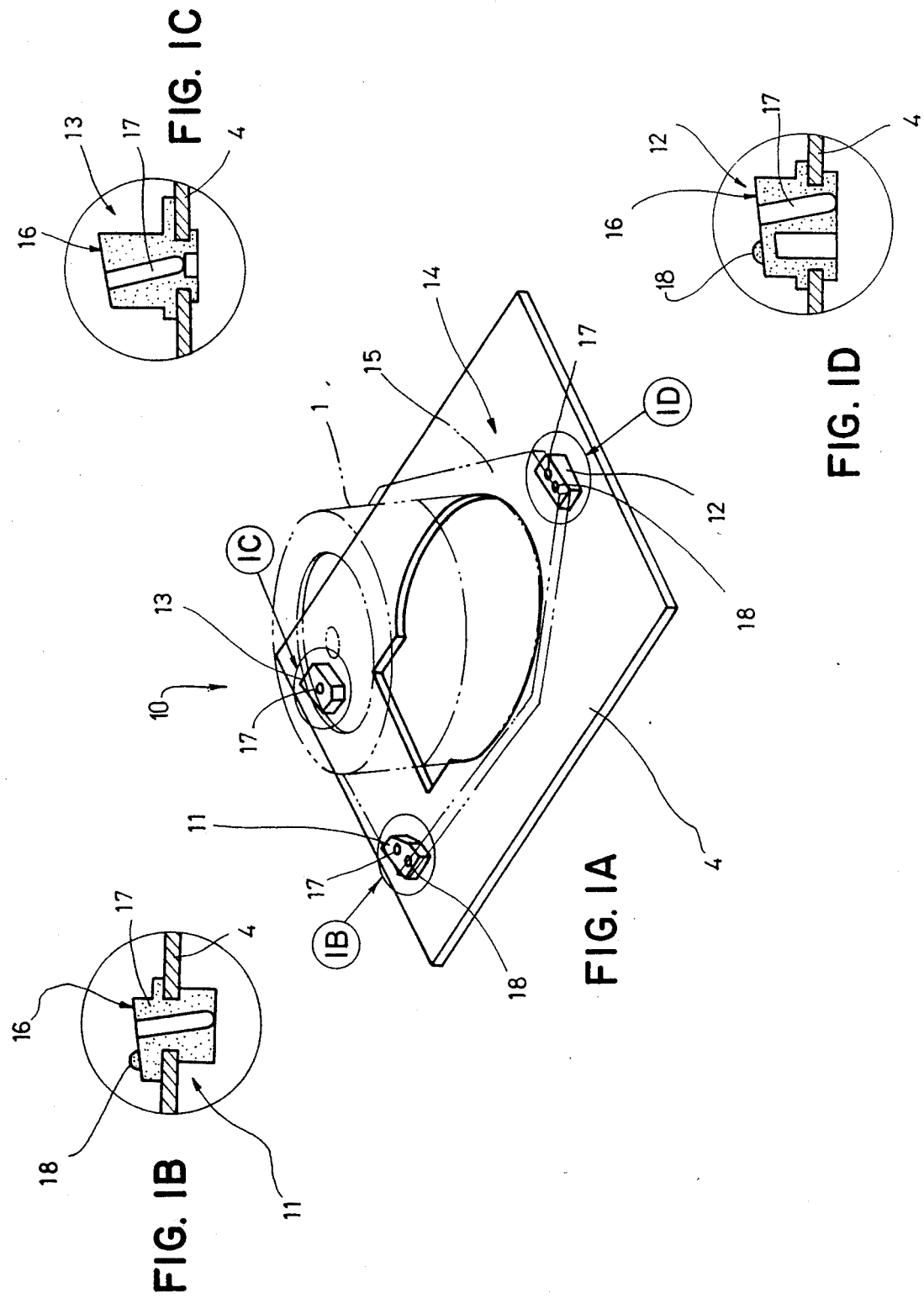
FIG. 1A is a perspective view of an embodiment of the rotary head mounting device according to the invention.
FIGS. 1B-1D are sectional views of the bases of the embodiment shown in FIG. 1A.

FIGS. 1A-D show an embodiment of the rotary head mounting device according to the invention. A rotary head mounting device 10 is made of synthetic resin and is formed integrally with a chassis 4 by outsert forming. The mounting device 10 comprises three oblique bases 11, 12 and 13 each having an oblique upper surface 16. By mounting a mounting portion 15 which extends laterally of the rotary head 1 on these three oblique bases 11, 12 and 13, the rotary head 1 can be fixed obliquely to the chassis 4.

The oblique bases 11, 12 and 13 have different heights which are determined depending upon their position on the chassis 4. The oblique base 11 has the smallest height to define the lowest oblique upper surface 16, the oblique base 12 has a middle height to define a middle oblique upper surface 16 and the oblique base 13 has the largest height to define the highest oblique upper surface 16. The angle of inclination of each oblique base with respect to the surface of the chassis 4 is the same.

These oblique bases 11, 12 and 13 are respectively formed with a mounting hole 17 which is vertical to the oblique upper surface 16. Each of these mounting holes 17 may be threaded for engagement with a screw 8.

Two of the three oblique bases 11, 12 and 13, i.e., 11 and 12 in this embodiment, are provided with hemispherical positioning projections 18 on the oblique surface 16 to facilitate positioning of the rotary head 1 in mounting it on the oblique bases 11, 12 and 13. The rotary head 1 can be positioned on the oblique bases 11, 12 and 13 by causing these positioning projections 18 to be engaged in depressions formed on the lower surface of the mounting flange 15 of the rotary head 1 whereby accuracy in mounting of the rotary head 1 can be ensured.

Figure 2:
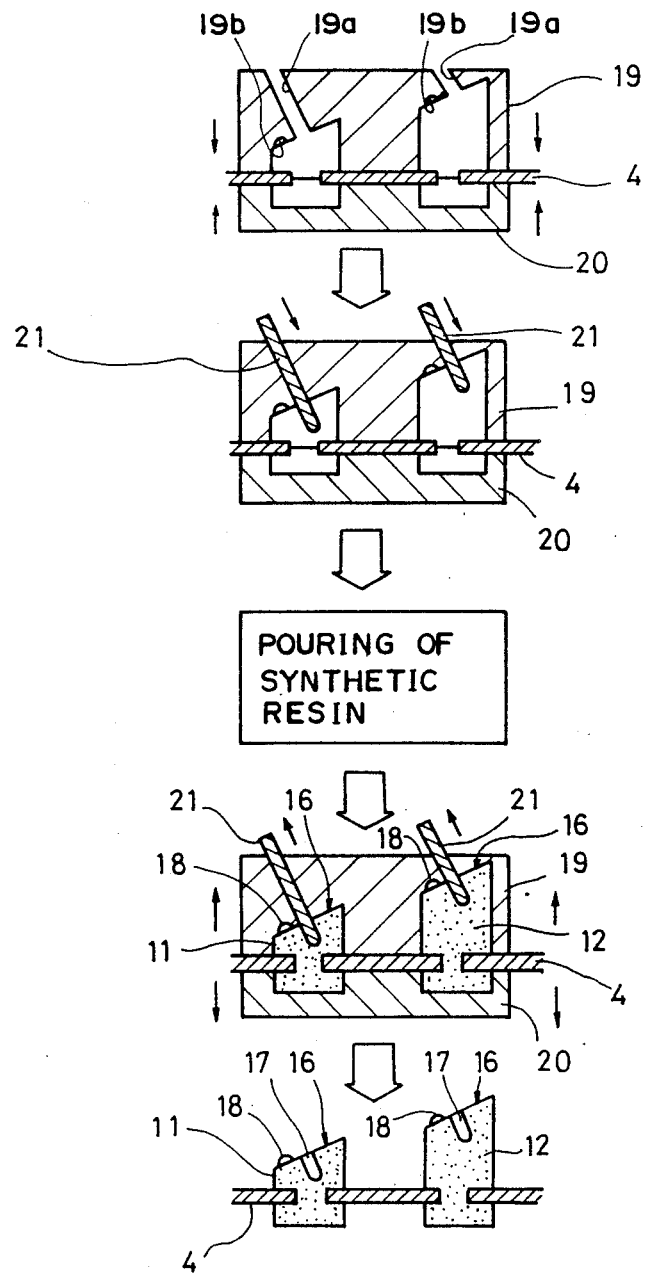
FIG. 2 is a schematic diagram showing a process of outsert forming the rotary head mounting device according to the invention.
Figure 3:
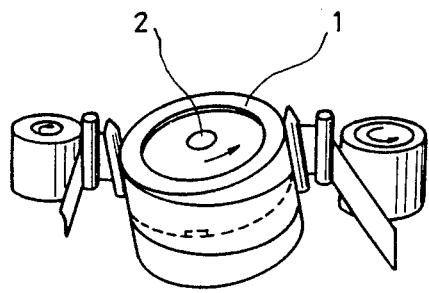
FIG. 3 is a perspective view for explaining the manner of mounting of a rotary head.
Figure 4A:
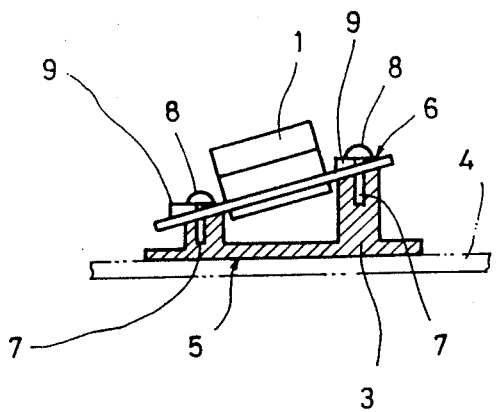
FIGS. 4a and 4b are sectional views of the prior art mounting adaptors.
Figure 4B:
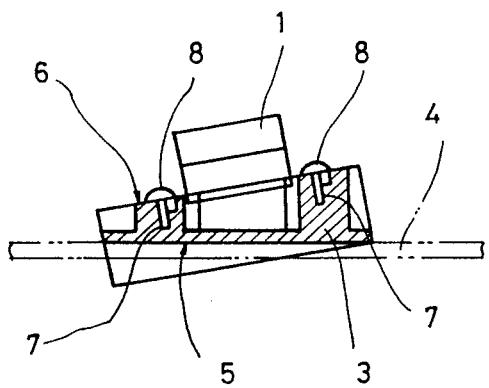

The above described oblique bases 11, 12 and 13 can be formed directly on the chassis 4 by outsert forming as shown schematically in FIG. 2. In this outsert forming process, an upper mold 19 and a lower mold 20 formed with cavities corresponding to the shapes of the oblique bases 11, 12 and 13 (in the figure, the oblique bases 11 and 12 only are shown) are attached to the chassis 4.

The upper mold 19 has openings 19a for inserting and drawing off draw pins 21 for forming the mounting holes 17 in the oblique bases 11, 12 and 13. The upper mold 19 further has depressions 19b corresponding to the positioning projections 18 of the oblique bases 11 and 12. The draw pins 21 are inserted in the cavities of the mold 19 through the openings 19a before pouring synthetic resin material in the cavities of the molds 19 and 20.

After completion of preparation in the above described manner, molten synthetic resin material is poured from an unillustrated inlet into the cavities of the molds 19 and 20 and is solidified.

In such outsert forming, accuracy of the mounting holes 17 formed by the draw pins 21 may not necessarily be high enough but the oblique upper surfaces 16 and the positioning projections 18 formed by the upper and lower molds 19 and 20 can be formed with sufficiently high accuracy.

After the oblique bases 11, 12 and 13 in the cavities of the molds 19 and 20 have been solidified, the draw pins 21 are pulled off and then the upper mold 19 and the lower mold 20 are released from the chassis 4 to leave the oblique bases 11, 12 and 13 formed integrally with the chassis 4.

By the employment of the draw pins 21, the upper mold 19 and the lower mold 20 can be released from the chassis 4 smoothly and, moreover, the mounting holes 17 vertical to the oblique upper surface 16 can be formed all at once. Since the positioning projections 18 are formed hemispherically, the upper mold 19 and the lower mold 20 can be released smoothly.

The rotary head 1 can be fixed on the chassis 4 directly by means of the rotary head mounting device 10 with a predetermined accuracy, namely by causing the positioning projections 18 of the oblique bases 11 and 12 to engage in the corresponding depressions of the mounting flange 15 of the rotary head 1 and then screwing the screws 8 into the mounting holes 17 through the openings of the mounting flange 15.

Since the oblique surface 16 and the positioning projection 18 are formed with predetermined accuracy, the mounting of the rotary head 1 is not adversely affected by the relatively low processing accuracy of the mounting hole 17.

In the above described embodiment, the mounting device 10 has three separate oblique bases 11, 12 and 13 but these oblique bases may be integrated into one or two oblique bases or, conversely, the mounting device 10 may have four or more oblique bases. In outsert forming of the oblique bases, a suitable relief may be provided, if necessary, in the upper and lower molds 19 and 20 to prevent distortion or strain occurring in the finished oblique bases.

What is claimed is:

1. A rotary head mounting device for mounting a rotary head obliquely with respect to a primary surface of a chassis such that a rotational axis of the rotary head is oblique to the primary surface of the chassis, comprising at least one oblique base molded on the chassis, each oblique base having a mounting surface which is oblique to the primary surface of the chassis for mounting a rotary head thereon and a mounting hole for receiving a fastener for fixing the rotary head to the mounting surface of the oblique base, wherein the mounting hole extends from the mounting surface of the oblique base into the oblique base, the central axis of the mounting hole being substantially perpendicular to the mounting surface of the oblique base, and wherein a mounting portion of the rotary head is fixedly mounted to the mounting surface of each oblique base by providing a fastener through the mounting portion of the rotary head and the corresponding mounting hole in each oblique base.

2. A device as defined in claim 1 wherein the number of said oblique bases is three.

3. A device as defined in claim 2 wherein at least two of said oblique bases comprise projections for positioning the rotary head on the mounting surface thereof.

4. A device as defined in claim 3 wherein said mounting holes are formed by draw pins which are used with upper and lower molds for forming the oblique bases.

5. A device as defined in claim 4 wherein said projections for positioning the rotary head are formed by said upper and lower molds.

6. A method for making a mounting device for mounting a rotary head such that a rotational axis of the rotary head is oblique to a primary surface of a chassis, wherein the mounting device comprises at least one base having a mounting surface oblique to the primary surface of the chassis and a corresponding mounting hole such that when a mounting portion of the rotary head is mounted to the oblique mounting surface of the base by way of a fastener inserted through the mounting portion of the rotary head and the mounting hole of the base, the rotational axis of the rotary head is oblique to the primary surface of the chassis, the method comprising the sequential steps of:

providing a chassis having a primary surface;

molding a base on the primary surface of the chassis such that the base is fixedly attached to the primary surface of the chassis, the base being molded so as to have a mounting surface oblique to the primary surface of the chassis and a mounting hole extending from the mounting surface of the base into the base, the central axis of the mounting hole being substantially perpendicular to the mounting surface of the base.

7. A method for making a mounting device for mounting a rotary head such that a rotational axis of the rotary head is oblique to a primary surface of a chassis wherein the mounting device comprises at least one base having a mounting surface oblique to the primary surface of the chassis and a corresponding mounting hole such that when a mounting portion of the rotary head is mounted to the oblique mounting surface of the base by way of a fastener inserted through the mounting portion of the rotary head and the mounting hole of the base, the rotational axis of the rotary head is oblique to the primary surface of the chassis, the method comprising the sequential steps of:

provgn a chassis having a primary surface and an opposing surface opposite the primary surface, the chassis having a hole through the primary surface and the opposing surface;

providing a first mold disposed on the primary surface over the hole and a second mold disposed on the opposing surface over the hole, the first and second molds having first and second cavities, respectively, the first and second cavities being connected by way of the hole and defining a base, wherein the first mold has a primary mold surface which defines a mounting surface of the base which is oblique to the primary surface of the chassis and an opening extending from an outer surface of the first mold into the first cavity so as to define a mounting hole extending from the mounting surface of the base into the base, the central axis of the mounting hole being substantially perpendicular to the mounting surface of the base;

inserting a pin through the opening such that the pin extends into the first cavity;

providing fluid material in the first and second cavities;

solidifying the fluid material;

removing the pin from the opening; and removing the first and second molds from the chassis.

* * * * *